United States Patent [19]

Dickey, Jr.

[11] 4,244,026
[45] Jan. 6, 1981

[54] VELOCITY MEASURING CORRELATION SONAR

[75] Inventor: Frank R. Dickey, Jr., Dewitt, N.Y.

[73] Assignee: General Electric Company, Syracuse, N.Y.

[21] Appl. No.: 957,908

[22] Filed: Nov. 6, 1978

[51] Int. Cl.³ ............... G01P 3/42; G06F 15/336; G01S 15/58

[52] U.S. Cl. ............... 364/565; 364/728; 367/89

[58] Field of Search ............... 364/565; 343/8; 324/175; 367/89, 90, 91

[56] References Cited

U.S. PATENT DOCUMENTS

| | | | |
|---|---|---|---|
| 3,147,477 | 9/1964 | Dickey, Jr. | 343/8 |
| 3,838,424 | 9/1974 | Goldfischer | 343/8 |
| 3,898,878 | 8/1975 | Stallworth et al. | 367/91 X |
| 3,991,398 | 11/1976 | Andermo et al. | 367/89 |
| 4,023,171 | 5/1977 | Stavis | 343/8 |
| 4,041,293 | 8/1977 | Kihlberg | 364/565 |
| 4,068,207 | 1/1978 | Andermo et al. | 367/89 |
| 4,103,302 | 7/1978 | Roeder et al. | 343/8 X |
| 4,106,017 | 8/1978 | Roeder et al. | 343/8 |

FOREIGN PATENT DOCUMENTS 348055  8/1972  Sweden ............... 364/565

OTHER PUBLICATIONS

Owen: Measurement of Speed by Cross-Correlation Using Pulse Frequency Signals, IEEE Transactions on Industrial Electronics and Control Instrumentation, vol. IECI-25, No. 2, May 1978, pp. 167–172.

*Primary Examiner*—Felix D. Gruber
*Attorney, Agent, or Firm*—Carl W. Baker; Richard V. Lang

[57] ABSTRACT

The velocity measuring correlation sonar disclosed employs a planar array of receiving transducers spaced in the directions along which velocity components parallel to the plane of the array are to be measured, and includes means for transmitting a series of two or more identical pulses which are separated by a time interval selected in accordance with transducer separation and the estimated velocity components so as to place the expected point of maximum correlation of the echo return from one pulse with that from a following pulse within the boundaries of a set of spatial sample points representing relative spacings between pairs of receiving transducers. Correlation measurements are made corresponding to these relative spacings of the receiving transducers, with each such measurement being treated as a sample of a space-time correlation function of predetermined shape. The location of the peak of this function in each of the directions of interest is estimated by curve fitting techniques, and yields the velocity vector in that direction scaled by the inter-pulse time interval. The velocity component normal to the plane of the array may be derived by estimating the location of the correlation peak as a function of time and/or phase, using similar curve fitting techniques.

10 Claims, 17 Drawing Figures

VELOCITY MEASURING CORRELATION SONAR

BACKGROUND OF THE INVENTION

This invention relates generally to measurement of relative velocity between a wave source-sensor combination and a field of scatterers, and more particularly to a velocity measuring sonar system for measuring the speed of a surface or submerged marine vessel relative either to the bottom or to the water mass at a predetermined range or depth below the vessel.

Conventionally, marine velocity measuring systems based on sonar concepts have used doppler techniques commonly employing four sonar emitters and receivers two of which are angled outwardly with respect to the vertical in the fore-and-aft plane and two similarly angled in the athwartship plane. Motion of the vessel then results in a doppler shift in frequency of the echo or signal return in each of the beams. For example, in the case of forward motion of the vessel there will be an upward doppler shift of the fore-directed beam echo and a downward shift of freqency of the aft-directed beam echo. Similar doppler shifts occur in the case of "leeway" or transverse motion of the vessel, thus enabling velocity measurement in both fore-and-aft and athwartship directions.

Doppler sonar velocity measuring systems of this general kind have come into wide use and function very effectively for many marine logging applications. They are subject to certain limitations, however, which tend to compromise their utility in others. Among these limitations are the sensitivity of the beam direction and hence the calibration to the bottom scattering characteristics which may be different in one area than in another, and the sensitivity of the calibration also to variations in the local sound velocity due to variations in water temperature, for example. Further, because of the narrow beams required, there may be difficulties of insuring overlap of transmit and receive patterns when large pitch and roll rates and long propagation delays are encountered. Other limitations derive from the rather stringent requirements as to transmit-receive beam pattern and the relatively large dimensions of the transmit-receive arrays necessary to achieve these patterns.

An entirely different approach to velocity measurement was disclosed by the present inventor some years ago in U.S. Pat. No. 3,147,477—Dickey. That patent first disclosed the use of correlation measurements to estimate the velocity of a source/sensor platform relative to an ensemble of fixed scatters. The patent is most detailed in its description of an aircraft ground speed measurement system, using radar or radio frequency waves for velocity determination, but the patent also discloses the measurement of speed of surface ships and submarines using sound waves. Operation of the correlation sensor is basically the same, as explained in the patent, irrespective of the frequency of the wave energy used or the composition of the medium through which it is transmitted and received.

Correlation sonar operates on the unique character of acoustic energy that has been back-scattered from an ensemble of scatters formed either by the bottom or by a volume of water intermediate the ship and the bottom. These scatterers are illuminated by the beam from a sonar transmitter directed vertically downward toward the bottom, and reflected back to two or more similarly directed receivers carried by the ship adjacent to the transmitter.

The echo or reflected energy returned from such myriad of bottom scatterers forms an interference field in the vicinity of the ship. If the ship is stationary and transmitting a continuous waveform, the field will be stationary and continuous. If the ship is moving, the continuous field will appear from the ship to be moving backward relative to the ship at twice the ship's actual velocity. This field motion can most easily be explained by noting that, as the ship moves, the range to the scatterers forward of the ship is decreasing while the range to the aft-scatterers is increasing, producing the effect of rotating the surface containing the scatterers about a point directly beneath the ship. This produces the apparent backward field motion.

A pair of downward-directed receiving hydrophones spaced along the longitudinal axis of the ship will sense the field, producing identical output waveforms except that the aft hydrophone's output will be delayed by an amount ($T_d$) equal to the spacing between hydrophones divided by twice the velocity (V) of the vessel, in accordance with the relation: $T_d = s/2V$. Thus by holding either the time delay or the hydrophone separation distance fixed while adjusting the other of these parameters in a manner to achieve maximum correlation, as indicated by identical or substantially identical output waveforms at the two hydrophones, and measuring the value of the variable at which this is achieved, the vessel velocity may readily be determined from the foregoing relation between these parameters.

If instead of a continuous transmitted waveform, pulsed transmissions are used, a similar field will be formed but it will display a time-varying characteristic as well as a spatially varying one. This enables correlation of signals received at the spaced hydrophones in any of several different ways, as will be further detailed hereinafter.

The correlation velocity sensor of the present invention is based on the principle of the aforesaid Dickey patent, and is directed more specifically to correlation velocity sensors for marine applications employing sonic or ultrasonic wave energy and a plurality of receiver transducers disposed in a fixed two-dimensional array. Measurement of the several components of relative velocity then is accomplished by cross-correlation measurements between the various echoes received at the several receiver transducers over a time interval.

The correlation velocity sensor of the present invention affords significant advantages both over doppler systems and over other known correlation sonar systems. This sensor can be designed to operate in any water depth, since requirements on beamwidth, propagation loss, and roll-pitch rates are not limiting. The calibration and accuracy of velocity measurement, insofar as concerns the horizontal velocity components, depends only on measured values of the spacings between transducers in the receive array and measured values of time, and is independent of sound propagation speed and of bottom scattering characteristics. Also, the use of a wide transmit bandwidth provides a larger time-bandwidth product for smoothing statistical fluctuations than usually is realizable in the doppler case.

These and other features and advantages of the correlation velocity sensor of the present invention will become more apparent in the light of the detailed description of the invention hereinafter.

BRIEF SUMMARY OF THE INVENTION

In carrying out the invention in one presently preferred embodiment, there is provided a fixed array of sonar transducers including at least one transmitting transducer and a plurality of receiving transducers or hydrophones spaced along the directions of relative motion along which velocity measurement is to be accomplished. For velocity logging with ships, submarines and other marine vessels, all the transducers are directed vertically downwardly with at least two of the received hydrophones being spaced along the longitudinal axis of the vessel and two others spaced perpendicularly thereto. The transmitter is energized to produce at least two identical transmissions, i.e. at least two successive pulses with the two pulses being of identical waveform and with the time interval between them being precisely ascertainable.

Two successive echoes normally do not have identical wave shapes when the vessel is moving relative to the scatters on the bottom. However, if the second of two echoes is received on a different hydrophone properly spaced with respect to the first, there is a certain combination of inter-pulse time interval and spacing between the two hydrophones which will result in maximized correlation of the signals received at those two phones. That is, if the hydrophone separation is properly related to the ship horizontal velocity and the inter-pulse time, the echo from the first transmission received in the forward hydrophone of the pair will have a waveform substantially identical with that of the echo from the second transmission received in the aft hydrophone of the pair.

Rather than continually readjust the inter-pulse time interval so as to maximize the identity or correlation of these received waveforms at the two hydrophones, correlation sonar systems in accordance with the invention provide only an approximate setting of the inter-pulse time interval and do not attempt to maintain this time interval at a value such that the corresponding ship travel is precisely related to the transducer spacing.

Instead, correlation measurements for various combinations of fore-aft transducer spacing are made and each measurement is treated as a sample of a space-time correlation function the shape of which can be computed from known or measured quantities. The location of the peak of this function is estimated by curve fitting techniques, and yields the ship's velocity vector scaled by the inter-pulse time interval. The calibration, so far as horizontal components of velocity are concerned, is independent of the velocity of propagation of sound and of scatterer characteristics and depends only on the known accuracy of the hydrophone spacings and the measured time delay. Both these parameters can be determined with high precision.

To obtain not only the forward velocity component but also the athwartship component, it is only necessary to perform the curve fitting operation in two dimensions using the output signals from transducers suitably spaced in a planar array. It is also possible in accordance with the invention to obtain a measure of any vertical velocity component which is present, as the existence of such components results in the correlation function peak occurring at a correlation delay time which is slightly different than the time separation between the two transmit pulses.

This small time difference enables one to measure the vertical velocity by locating the correlation peak as a function of time, while simultaneously the location of the peak of the correlation function in the array plane provides the two horizontal velocity components. Thus there is provided a complete velocity measurement using only a simple two-dimensional array and requiring transmission of only a single pulse train of two or more pulses. These measures may be used along with a compass to provide velocity information in true coordinates. A pair of inclinometers or other means for measuring roll and pitch of the ship also may be used in correcting for ship's motion. In other applications the sonar may provide velocity inputs to an inertial navigation system.

DETAILED DESCRIPTION OF THE PREFERRED EMBODIMENT

Figure 1:
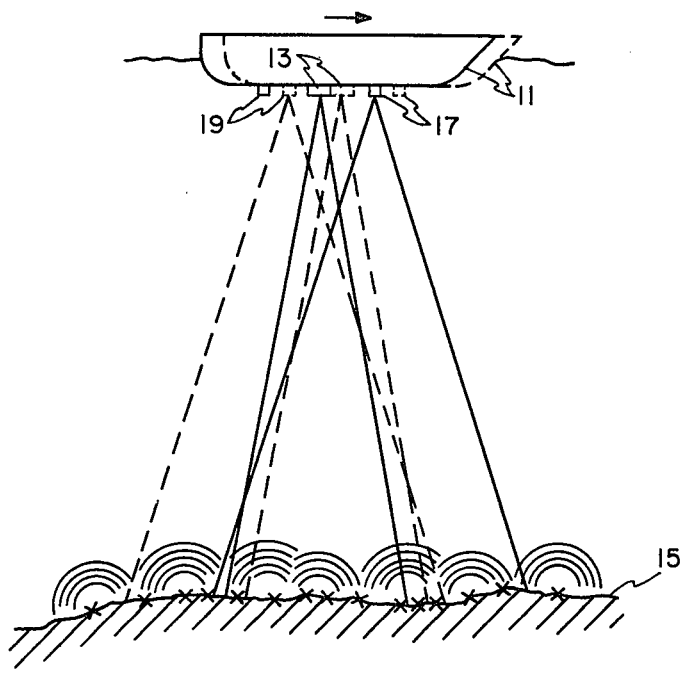
FIG. 1 illustrates conceptually the operation of a prior art correlation sonar velocity sensor carried by a surface vessel.
Figure 2:
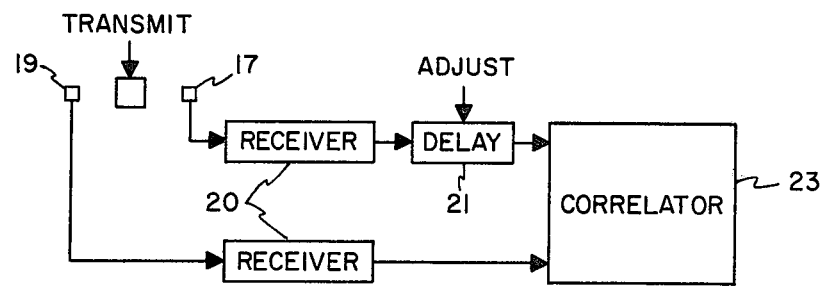
FIG. 2 illustrates a prior art correlation system.

The velocity measuring correlation sonar of the invention can perhaps best be understood by first considering a basic correlation sensor as illustrated in FIGS. 1 and 2, operating in accordance with the principles disclosed in the aforementioned Dickey patent. In FIG. 1, the ship 11 carries a sound or ultra-sound transmitter 13 directed generally downwardly toward the bottom, as indicated at 15. The sound is scattered from numerous points on the bottom with each such point acting as an individual source of unknown amplitude and phase. The entire collection of scatterers may be thought of as a large array of sources on the bottom which re-radiates sound back to the vicinity of the ship. Such an array, being randomly phased, will radiate a pattern of random lobes. Thus it will produce sound intensities which vary from point to point in space. If the ship were stationary this pattern of intensities would be fixed in space and also would remain more or less invariant with time.

If the ship moves toward the right in FIG. 1, the distances which the sound waves travel in reaching scatterers to the right of the ship's present position are shortened while the distance to other scatterers to the left of the ship's position are lengthened. The effect, so far as the radiating properties of the entire array of scatterers is concerned, is similar to that which would be produced by a small angular rotation of the bottom. As viewed in FIG. 1, this rotation is counter-clockwise about a point on the bottom directly under the ship. Thus the first-order effect of horizontal motion of the ship is that the bottom-scattered sound field in the vicinity of the ship retains its form but appears to move backward as the ship moves forward. At the ship's hull, such apparent backward motion of the sound field is at the same velocity as the forward velocity of the ship. Hence the total effect is that the sound field appears to move relative to the hull at exactly twice the velocity of the ship relative to the bottom.

The velocity of this sound field relative motion can be measured by comparing waveforms received at the two hydrophones 17 and 19 spaced along the longitudinal axis of the ship's hull. These comparisons are made by cross-correlation, as by multiplying the signal outputs of the two hydrophones, averaging the result, and detecting the peak in the correlation function thus measured. Such correlation processing is illustrated in FIG. 2.

With the two received hydrophones located as just described, each will follow the same path in space, assuming no drift, and each accordingly will see the same sound intensity variations, and will produce through its associated receiver 20 the same output waveform, but displaced in time. The forward transducer 17 will see this sound intensity pattern earlier than the aft transducer 19. If a variable delay line as at 21 is inserted in the output of the forward transducer 17, the delay can be adjusted to make the two waveforms coincide or at least to maximize the identity between them as sensed by correlator 23. The time delay which maximizes this correlation is equal to the time it takes the sound field to move a distance equal to the hydrophone separation, or what amounts to the same thing, the delay is equal to the time requiredd for the ship to move half that distance.

The hydrophone separation can be fixed and the time delay varied to achieve maximum correlation as just described, or the time delay may be fixed and the hydrophone separation varied. In either case the forward speed $v_x$ is given by:

$$v_x = (s/2T_d) \quad \text{(Equation 1)}$$

where s equals the separation between the receive hydrophones and $T_d$ is the magnitude of the time delay which must be introduced into the forward hydrophone signal channel in order to achieve correlation.

It is important to note that the correlation delay is not directly related to echo return time. In shallow water the echo time usually will be less than the correlation delay, and in deep water it usually will be longer. In either case the correlation delay which maximizes the correlation depends only upon the receive hydrophone spacing and the ship velocity.

The foregoing explanation assumes continuous wave (CW) transmission. With pulsed transmissions, similar sound intensity patterns are generated by reflection from the bottom scatterers back to the proximity of the ship, and these patterns remain stationary if the ship is stationary and move if the ship moves, just as explained above. In this case, however, the sound field also is a function of epoch time, that is, of time within a transmission-reception cycle.

Hence the concept of spaced receivers sensing indentical waveforms at different times remains valid with pulsed transmissions, but here the waveform resulting from one transmission cycle must be compared with that resulting from another transmission cycle. This means that the time delay value to be used in correlation of returns cannot be chosen independently of transmissions, but must be related to the time between transmissions. In one such relationship, with a periodic waveform, the pulse repetition period is made precisely equal to the value of time delay which provides maximum correlation between successive pulse returns at the spaced receivers.

Figure 3:
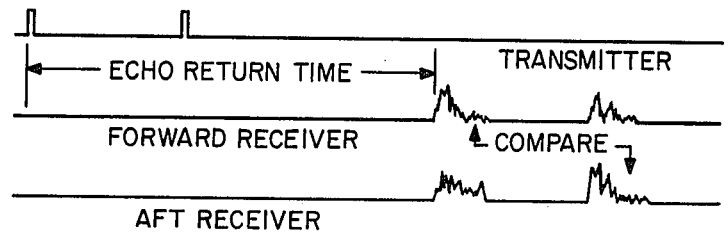
FIG. 3 illustrates typical operating waveforms.

FIG. 3 illustrates typical waveforms which might occur in such a system transmitting short pulses. The received echos are longer than the transmitted pulses and the amplitude fluctuates within each pulse because many different scatterers at different ranges are returning echos. The echo signal amplitude as sensed by each of the hydrophones also fluctuates from pulse to pulse, due to the movement of the hydrophone with respect to the sound field as it moves along the ship's hull. Echo signal amplitude values taken at the same point in space at successive cycles, from either the same or other transducers, constitute samples of the same moving sound field and hence are similar. Two spaced transducers, with proper time delay in the signal output of one of the two, accordingly can sample the sample points in the sound field and their outputs thus will become highly correlated. At the point of maximum correlation, the time delay will be just equal to the pulse repetition period or to a multiple of such period, and the pulse repetition accordingly becomes a measure of ship velocity. Velocity measurement in this way requires, of course, precise and continuously adjustable control of pulse repetition period.

Figure 4:
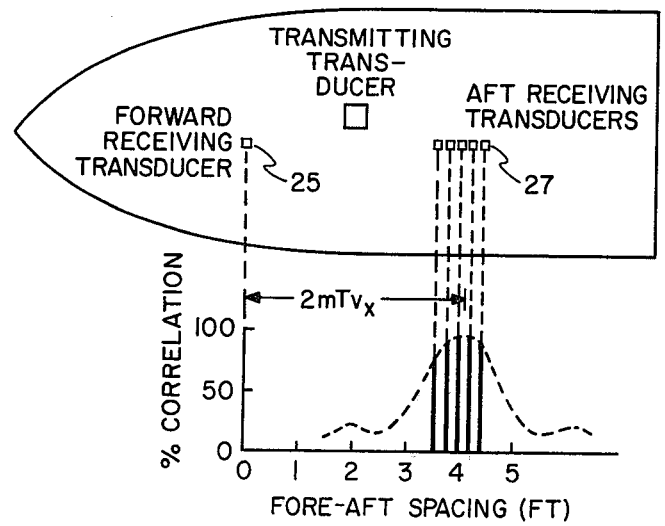
FIG. 4 illustrates conceptually a correlation sonar velocity sensor using a linear hydrophone array.

FIG. 4 illustrates a technique for determining the location of the correlation magnitude peak not requiring such control of pulse repetition period; the interpulse time interval must be known but the repetition period requires at most only coarse control and adjustments may be digitally quantized without sacrifice of accuracy of the velocity measurement. In FIG. 4, a single forward receiving transducer 25 and a plurality of aft receiving transducers 27 are shown ordered in a linear array spaced along the longitudinal axis of the vessel. Signals from the forward receiver are delayed and correlated with signals from each of the five aft receivers using generally the same signal processing as illustrated in FIG. 2 but with a fixed value of time delay.

For an assumed horizontal speed and a selected time delay, the selected delay being equal to or a multiple of the pulse repetition period, the correlation magnitude will be found to peak at a receiver separation equal to twice the ship's speed times the delay. The shape of the correlation function can be calculated and typically may be as shown by the dashed curve in the lower part of FIG. 4. As there indicated, the spacing between the forward receiver and the location of the correlation magnitude peak along the length of the aft receiver array is given by $2mTv_x$. In this relation T is the pulse repetition period and M is an integer selected so as to place the correlation magnitude peak at a point somewhere within the length of the aft receiver array.

This basic technique for locating the maximum of the correlation function is employed in the correlation velocity sensors of the present invention. Pulsed transmissions are used, with each transmission comprising two or more identical pulses having precisely known time intervals between them. The inter-pulse intervals are adjusted as a function of ship velocity, but the relationship maintained need be only approximate, and the pulse interval or pulse repetition rate is not relied upon as a direct measure of ship speed as in prior systems. Accuracy of velocity measurement is therefore not affected by the precision with which the pulse repetition rate may be controlled, and the pulse interval may be adjusted in discrete steps thus facilitating digital implementation of the system.

Figure 5:
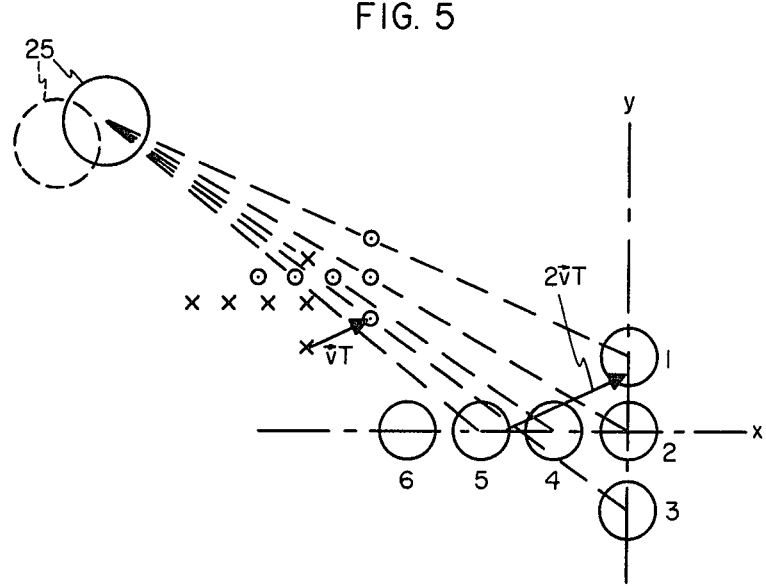
FIG. 5 illustrates a planar hydrophone array.

Referring now to FIG. 5, there is shown one possible configuration of a transmitter-receiver array in accordance with the invention. With the array geometry shown, and assuming a stationary set of bottom scatterers located in the far field relative to the array, it can be shown that the resulting echo shape at the receive transducers is the same as it would be if both the transmit and receive transducers were located at the midpoints between their actual locations. This midpoint relationship permits the simultaneous acquisition of a multiplicity of echoes characterized by location relative to the scatterers. It also provides another explanation for the factor of 2 which appears in Equation 1 defining the relationship between spacing and ship's motion compensation.

To illustrate this, FIG. 5 shows the transmitter transducer 25 in solid lines in a position occupied by it during a pulse transmission from which the resulting echoes are later incident upon the receiving array at its location also shown in solid lines. The midpoints between the transmitter and each of the receivers are indicated by circled points and represent locations characterized by the observed echoes. They form an array of points whose orientation is the same as that of the receiving array but whose dimensions are half those of the receiving array.

To explain why correlation occurs between echoes from different transmissions, an additional set of midpoints indicated by the small x's in FIG. 5 may be defined. This second set represents the midpoints for transmission and reception of the leadiing pulse of a pulse pair, while the first set represents the midpoints for transmission and reception of the following pulse of the pair. The transmitter position while emitting this latter pulse is indicated in dotted lines; the receiver position is not shown in FIG. 5 but would be displaced similarly to the transmitter. Both midpoint sets move through space at the velocity of the ship.

The expected value of correlation between echoes from a transmitted pulse pair is a function of the separation in space between the corresponding pair of midpoints, the correlation being high only if the points are close together. Since the distance between any point in one set and any point in the other set is a known function of the vector displacement $\vec{v}T$ between the points, the expected value of correlation also is a known function of $\vec{v}T$. By applying a curve fitting algorithm to the measured values of correlation and the known receiver transducer spacings, an estimate of $\vec{v}T$ is made.

In practice it is convenient to use $2\vec{v}T$ instead of $\vec{v}T$, since this quantity is directly related to transducder separation values. Also, allowing for different values of ship's velocity during transmission ($v_t$) and during reception ($v_r$), and further allowing for the possibility of using $m^{th}$ rather than the next adjacent pulse in a train of equally spaced transmitted pulses, the vector displacement which is to be solved for becomes $(\vec{v_t}+\vec{v_r})mT$.

Thus velocity is determined by estimating the location of the peak of the correlation function on the basis of measured values obtained at known points, i.e., at points each representing in vector space the physical separation between two receiving transducers in real space. A set of such points defined in the horizontal plane represents the vector spacings between the various possible pairs of transducers in the receiving array, assuming the array to be a horizontal planar array which is the usual case.

Figure 6:
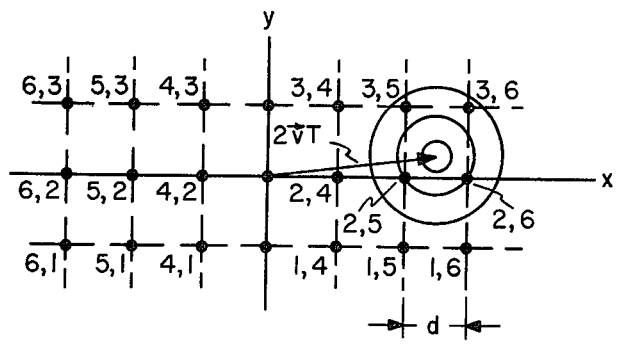
FIG. 6 illustrates space-time correlation in vector space showing horizontally displaced data points for the array of FIG. 5.

FIG. 6 illustrates the available points for the array of FIG. 5. Many of the points may be obtained in more than one way, as for example two spacings ($2d$) in the $+x$ direction may be obtained either as transducer 2 relative to transducer 5 or as transducer 4 relative to transducer 6. The spatial-sample points in FIG. 6 represent differences in hydrophone locations, rather than actual hydrophone locations, and the vector $2\vec{v}T$ is defined by the line connecting the origin with the point of maximum correlation as indicated by the equal correlation contour of greatest magnitude.

Figure 7:
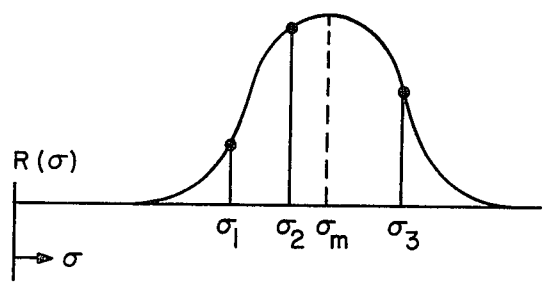
FIG. 7 illustrates the process of curve fitting to determine the location of maximum correlation.

In practicing the invention this necessary determination of the location of the peak of the correlation function is accomplished by a curve-fitting process. This process is illustrated in one dimension in the diagram of FIG. 7. Here a spatial correlation function which has a maximum at $\sigma=\sigma_m$ is shown to be sampled at three separation distances $\sigma_1$, $\sigma_2$ and $\sigma_3$. When the shape of the function is known or its general shape is predictable, as it is here, $\sigma_m$ can readily be estimated from the measured values when fitted to the curve as shown. The process of curve fitting may be described in more general terms for the case of transducer spacings in two dimensions as is shown, for example, in FIG. 6. The magnitude of the expected correlation as a function of spacing is a function that is independent of the velocity except for a displacement that is proportional to velocity. At zero velocity the function has a single peak at the origin, is symmetrical about the origin, and has a width and general shape which can be computed in terms of the system geometry, primarily in terms of the transmit and receive beamwidths. When there is relative motion between the platform and the scattering field, and assuming the motion to consist of a velocity parallel to the plane of the hydrophone array, which normally is horizontal, the shape of the function is unchanged except that it is displaced by the amount 2vT. Thus if the coordinates of the peak are defined as $\sigma_x$, $\sigma_y$ the components of the velocity are $v_x=\sigma_x/2$ T and $v_y=\sigma_y/2$ T.

The process of determining $\sigma_x$ and $\sigma_y$ by curve fitting, so that $v_x$ and $v_y$ then may be calculated, can involve any of several well known mathematical techniques. The function to be fitted to the data can, to some extent, be selected for mathematical simplicity. A parabolic shape can be used, for example, though it provides close approximation to the physical model only near the peak. A gaussian function is more suitable and can provide a very adequate fit to the physical situation.

The process of curve fitting can involve either a statistical fit to a large number of points or an exact fit to a small number of points, usually 3. The former is preferable from the standpoint of accuracy but the latter is adequate for many applications and requires less computation. In the case of statistical methods, an algorithm is used which adjusts the variables ($\sigma_x$ and $\sigma_y$ or $v_x$ and $v_y$) such that a chosen criterion is optimized. For example the sum of the squares of the differences between the correlation magnitudes at each sample point and the value of the function at that point may be minimized. The use of this least-mean-square criterion leads to well known methods that are described in the literature.

In the case of the exact fit, the two-dimensional set of data is converted into two one-dimensional sets of three points each in a manner to be described. A separate fit then is made in each dimension, the curve to be fitted being written as a function of three variables. The process then reduces to the simultaneous solution of three equations and three unknowns. An algorithm which will be described subsequently is based on this method although, for reasons that will be explained, it involves three rather than two dimensions.

In some applications the vertical component of ship's velocity as well as two horizontal components may be required. In theory at least, a three-dimensional array could allow the technique just described to provide all three components of the ship's velocity, including the vertical component, but a receiving array using three spatial dimensions generally is not practical. However, the total velocity including the vertical component can be measured by techniques that will be described next. The vertical velocity component, or more precisely the velocity component along the beam direction (this being approximately if not exactly vertical), causes a slight contraction or expansion of the received waveform relative to that transmitted. This phenomemon, when applied to a sine wave, is the usual doppler effect but it is best viewed here as a change in the interpulse time for received pulses relative to that for the same pulses when they were transmitted.

The vertical velocity or velocity in the beam direction in terms of the time difference is given by $$v_z = (c/2T)(\Delta T) \quad \text{(Equation 2)}$$

where T is the pulse repetition period used in transmission, $\Delta T$ is the change in pulse interval as perceived at the receiver time and c is the sound propagation velocity. (The sound propagation velocity which should be used here differs slightly in theory from the usual value because waves travelling in slightly different directions are combined but the difference is quite small.) The time $\Delta T$ and hence the velocity component $v_z$ can be determined by using either one of two types of data, phase or amplitude, or by combining the two types.

Phase data is obtained by processing the received signals in a manner to retain signal phase information relative to a carrier frequency. In this case the measured correlation values can be treated conveniently as complex numbers having phase and magnitude. The magnitude values can be used as previously described to obtain the forward and athwartship velocity components, or more specifically, to determine by curve fitting the coordinates $\sigma_x$, $\sigma_y$ of the correlation peak and thence the velocity components in the plane of the receiving array, $v_x$ and $v_y$. After this is done, an estimate of the phase $\phi_c$ of the complex correlation at the peak can be obtained by going back to the complex correlation values and calculating the phase of a weighted sum of complex values near the peak.

The phase estimate $\phi_c$ when converted to time by relating it to the duration of a carrier cycle yields the time difference for use in Equation 2, that is, $$\Delta T = \phi_c/2\pi f_o \quad \text{(Equation 3)}$$

where $f_o$ is the carrier frequency.

Alternatively, a curve fitting process may be employed using the real part of the complex values, rather than simply magnitudes. If this is done the phase information is retained and the process yields an estimate of the value of $v_z$ directly. The use of phase information in this way yields estimates of $v_z$ that are very accurate but, if the range of values over which $v_z$ is to be measured exceeds a value corresponding to a phase of $2\pi$ radians or one cycle of the carrier, then the estimates become ambiguous. In some cases, particularly when the required range of vertical speed is small and when fairly broad beams are used, the ambiguity does not present a problem and phase information alone can be used for vertical velocity determination.

The other type of data that can be used in determining vertical velocity $v_z$ is amplitude information which is the same type used for $v_x$ and $v_y$. In general, amplitude information, when used to determine $v_z$, is less accurate than phase information but has the advantage that it is not subject to ambiguity. The amplitude data consists of correlation measurements that have been made by correlating complex signals and retaining the magnitudes of the complex correlation values.

To make use of amplitude information, correlation measurements for two or more different time delays are made, with each measurement being treated as a sample of a three-dimensional correlation function, the location of the peak of which can be estimated by curve-fitting techniques to yield the ship's total velocity vector scaled by the pulse repetition period T. The use of a time delay, $T_R$, which is different from the pulse repetition period T, has an effect which can be visualized as taking a set of sample points which initially are in the plane of the array and moving them in the direction of wave propagation, which is approximately normal to the array, by an amount $c(Y_R - T)$. The use of several equally spaced values of time delay then results in a three-dimensional array consisting of horizontal layers with points in one layer being approximately but not necessarily exactly above the corresponding points in the layer just below.

Figure 8:
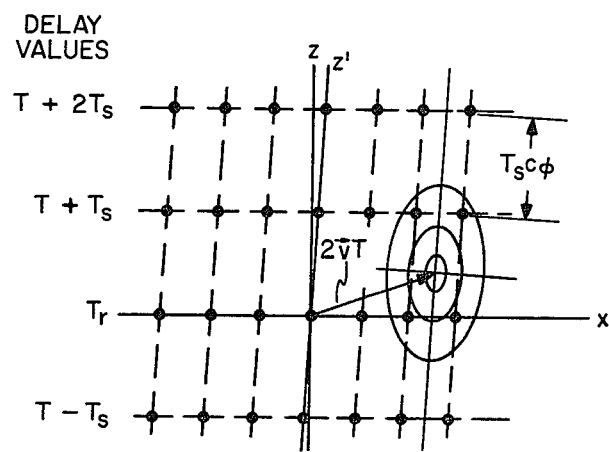
FIG. 8 illustrates space-time correlation in vector space showing data points displaced vertically as well as horizontally.

FIG. 8 represents a vertical cut through such an array, for values of $(T_k - T)$ of $-T_s$, O, $+T_s$ and $+2T_s$. The propagation direction is indicated by the z' axis which is assumed to be tilted slightly in the z direction relative to the true vertical axis z. The deviation of the effective beam axis z' from the vertical normally is small and often may be neglected, but it is taken into account in the velocity algorithm disclosed hereinafter.

The shape of the correlation function again is indicated in FIG. 8 by typical contours. To obtain the vertical velocity, curve fitting assuming known shape and unknown displacement in time is used to locate the correlation peak and thence to determine the vertical velocity vector in generally the same manner as for the horizontal velocity components discussed hereinbefore.

In order to obtain a high degree of accuracy in measuring vertical velocity using amplitude information, it is necessary to use wide-band receivers and to transmit either very short pulses or wide-band coded waveforms. If requirements on vertical velocity measurement are severe both in terms of high accuracy and wide range of values to be measured, it may be desirable to use both amplitude information and phase information and combine the result into a single measurement.

In this case a coarse estimate of ΔT is obtained from the amplitude information and a fine estimate is obtained from the phase. The latter estimate is subject to ambiguity and therefore cannot be used by itself but the former can be made accurate enough to resolve the phase ambiguity, that is, to determine the value of ΔT to within one carrier cycle. The two values then can be combined to give an accurate final value. In the digital implementation described hereinafter, the phase $\phi_c$ is used in Equation 3 to determine the least significant digits of a binary representation of ΔT while the most significant digits are determined by the magnitude data through the process of curve fitting, thus avoiding any ambiguity in the final result.

Figure 9:
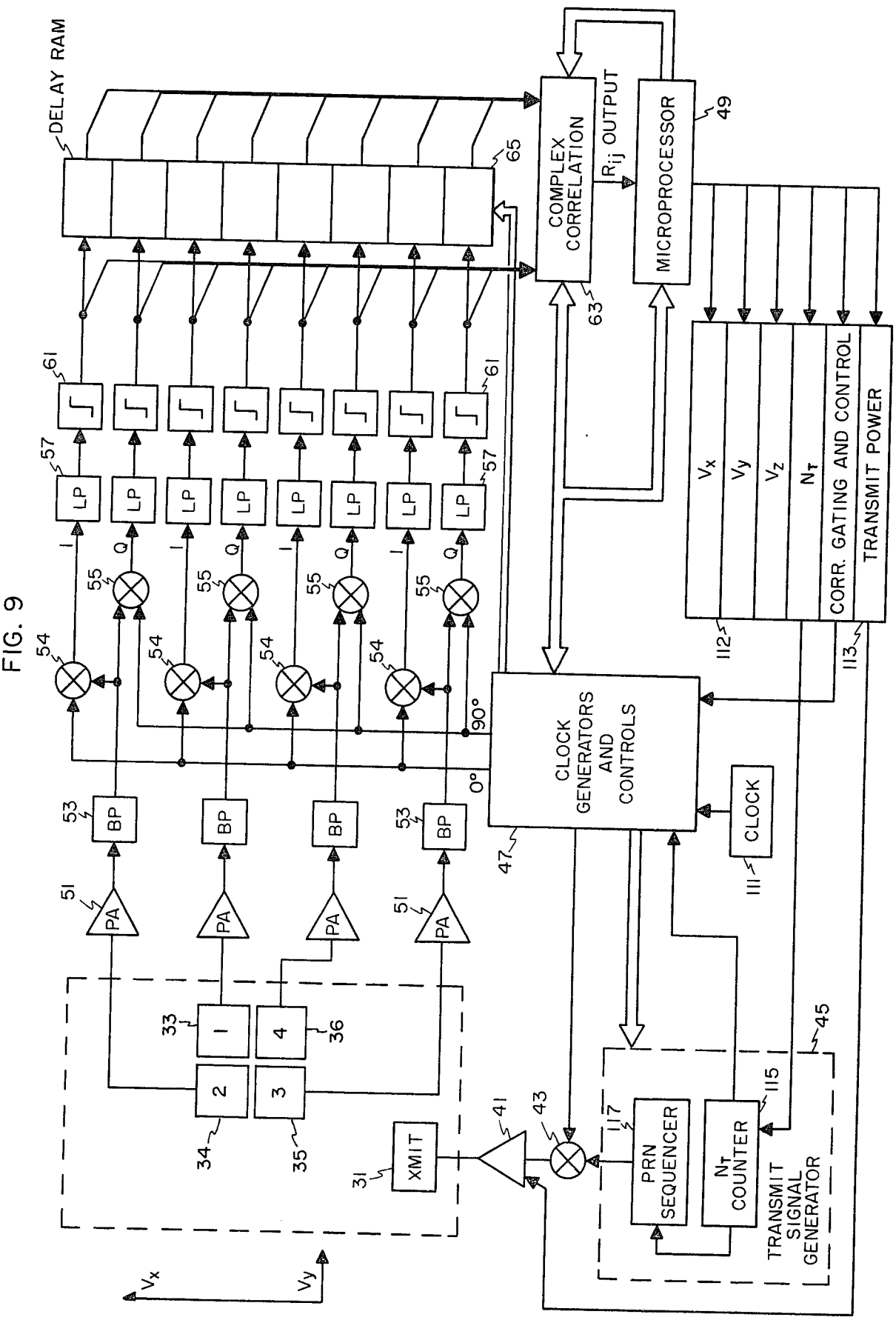
FIG. 9 is a block diagram of a correlation velocity sensor including the associated signal processing system.

The correlation sonar velocity sensor of the present invention may be implemented using either analog or digital processing. Because the required signal processing is relatively complex, however, it has been found desirable generally to effect an analog-to-digital conversion fairly early in the processor chain, and to perform the bulk of the processing using digital devices including either a microprocessor or a small general purpose computer commonly called a "minicomputer". Such an implementation is illustrated in FIG. 9.

Figure 10:
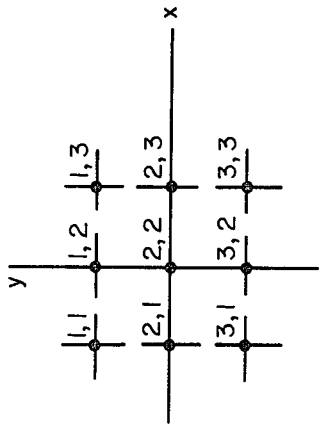
FIG. 10 illustrates correlation data points with the array of FIG. 9.

With reference to that figure, it will be noted that the transducer assembly shown comprises a transmitting transducer 31 and four receiving transducers 33–36 disposed in a square with the transmitting transducer disposed adjacent the square. This receiving transducer array configuration is functionally similar to the T configuration illustrated in FIG. 5, in the sense that vector spacings identical to many of the spacings between element in the T array can be found also between transducer elements in the four-square array. Thus this alternate array configuration provides a set of vector separations as illustrated in FIG. 10 which is similar to though reduced in number from that of FIG. 6.

The transmit transducer 31 is driven by a transmit power amplifier 41 at a carrier frequency $f_o$ modulated at 43 by a transmit signal generator 45. The transmitted waveform typically consists of two identical pulses with the second pulse being initiated later than the initiation of the first by a precisely known time interval T. The waveform may consist of more than two pulses, and may be modulated or coded in a number of different ways so long as the modulation coding is precisely repeated from pulse to pulse. The train of two or more such pulses, which together constitute the transmitted waveform, usually is repeated at a longer time $T_p$.

The time intervals $T_p$ and T, as well as the carrier frequency $f_o$, the pulse train configuration and the time duration of each pulse, all are controlled by timing circuits included in the clock generator and controls block 47 which is controlled in turn by the microprocessor 49 as hereinafter explained. The interval T is selected by the microprocessor using criteria involving the ship's speed, and typically may be of the order of 0.1 second. The interval $T_p$ is selected by criteria involving, primarily, the water depth, and depending on water depth it may vary from a fraction of a second to ten or more seconds.

Each of the receiving transducers 33–36 is connected to a preamplifier 51 followed by a bandpass filter 53 and a pair of synchronous demodulators or phase sensitive detectors 54–55 providing as their respective outputs the in-phase (I) and quadrature (Q) components of the demodulated signals. The demodulators of each pair are driven by reference voltages, at the transmitter carrier frequency $f_o$, which differ in phase by 90° so as to produce the desired I and Q components.

The in-phase and quadrature signal outputs from the demodulators are low-pass filtered as at 57, and each is then applied to an analog-to-digital converter 61 which as indicated may take the form of a clipper or limiter circuit providing a two-level or one-bit quantization of the input signal. The signals thus quantized are sampled at the inputs to a delay RAM (random access memory) 65 and at the inputs to a complex correlator designated by box 63, with samples being taken at predetermined sampling intervals $T_s$ under control of the system clock generator 47. The sets of samples from predetermined time intervals during each transmit-receive cycle are stored and operated on by the velocity algorithms in the microprocessor 49 to yield the desired horizontal and vertical velocity components.

As previously stated, velocity is determined by estimating the location of the peak of a correlation function on the basis of measured values obtained at known points, the points being defined in the horizontal direction as vector spacings between the receiving transducers, that is, combinations of fore-aft and port-starboard spacings. The velocity estimation starts with measured values $R_{ij}(T_k)$ of complex correlation between the transducer signals, with correlation values being derived as between the undelayed transducer signals (i) and the signals (j) as delayed by time $T_k$ in RAM 65. These measured values are derived by processing the entire set of I and Q signals through a delay RAM (random access memory) 65, which delays each signal by $T_k$, then correlating or taking the weighted product of each of the delayed and undelayed values of each of the receiving transducer signals. The delay $T_k$ introduced by RAM 65 is controlled by the clock generator and control unit 47; it normally is made equal to the pulse repetition interval T, and equal to some multiple of the sampling interval $T_s$.

The computation required to obtain the correlation measurements consists of summing the products of signal samples. In this implementation each sample is complex and consists of two real values. Each complex product involves four real products. Each real value is quantized to one bit which may be considered to be the sign bit. Each real product then reduces to an "EXCLUSIVE-OR" logic operation which is much simpler to implement than is the usual digital multiply operation.

Figure 11:
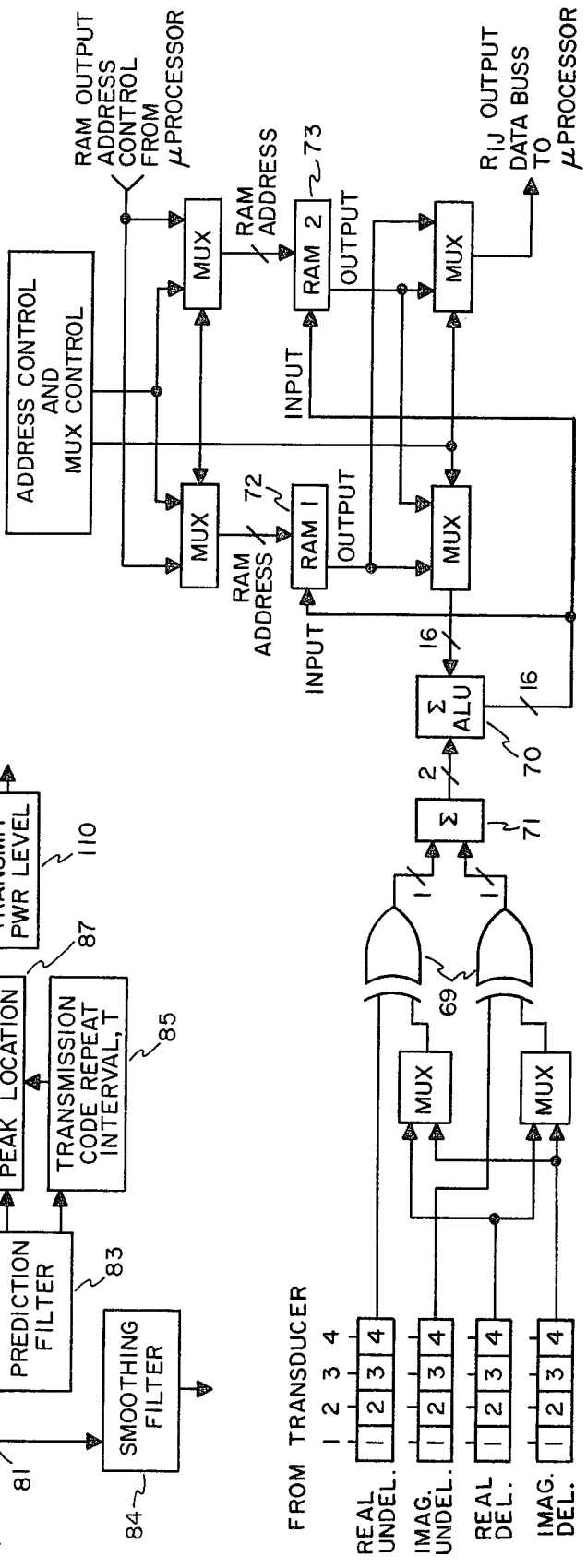
FIG. 11 is a block diagram of the complex correlator used in the system of FIG. 9.

The individual complex correlations are performed by shift registers and associated logic as illustrated in FIG. 11. The operations are done sequentially with the exception that multiplications are done two at a time by a pair of EXCLUSIVE-OR circuits 69, with the resulting one-bit products being summed by a one-bit adder 71. Data is fed to the EXCLUSIVE-OR circuits in sequence by the parallel-to-serial shift registers 67, the sequence being such that the output values from adder 71 constitute alternately the real and imaginary parts of a complex product and these constitute in turn the 16 complex products resulting from pairing the four undelayed signals with the four delayed signals.

The sequence of products repeats during each sampling interval with a summation of each one of the various products being generated starting at a pre-set time, dependent on the range to the nearest portion of the scattering field, after the start of transmission of the second pulse and continuing for a pre-set number of sampling intervals dependent on the range to the farthest portion of the scattering field and on the transmitted pulse duration. The sums are accumulated in a swinging memory consisting of RAM's 72 and 73 with the additions being done at a 16-bit ALU 70, and subsequently are read into the microprocessor 49 under its control.

Figure 12:
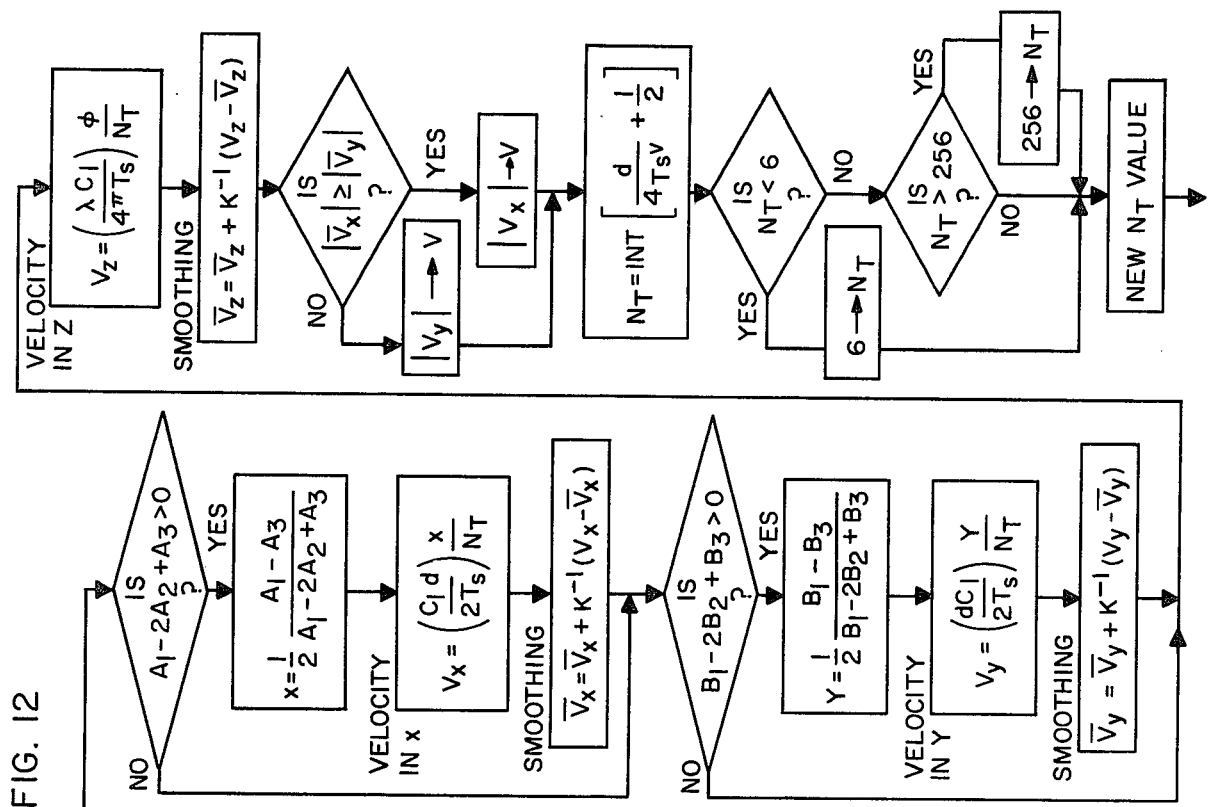
FIG. 12 is a logic flow chart for velocity determination in the system of FIG. 9.
Figure 12:
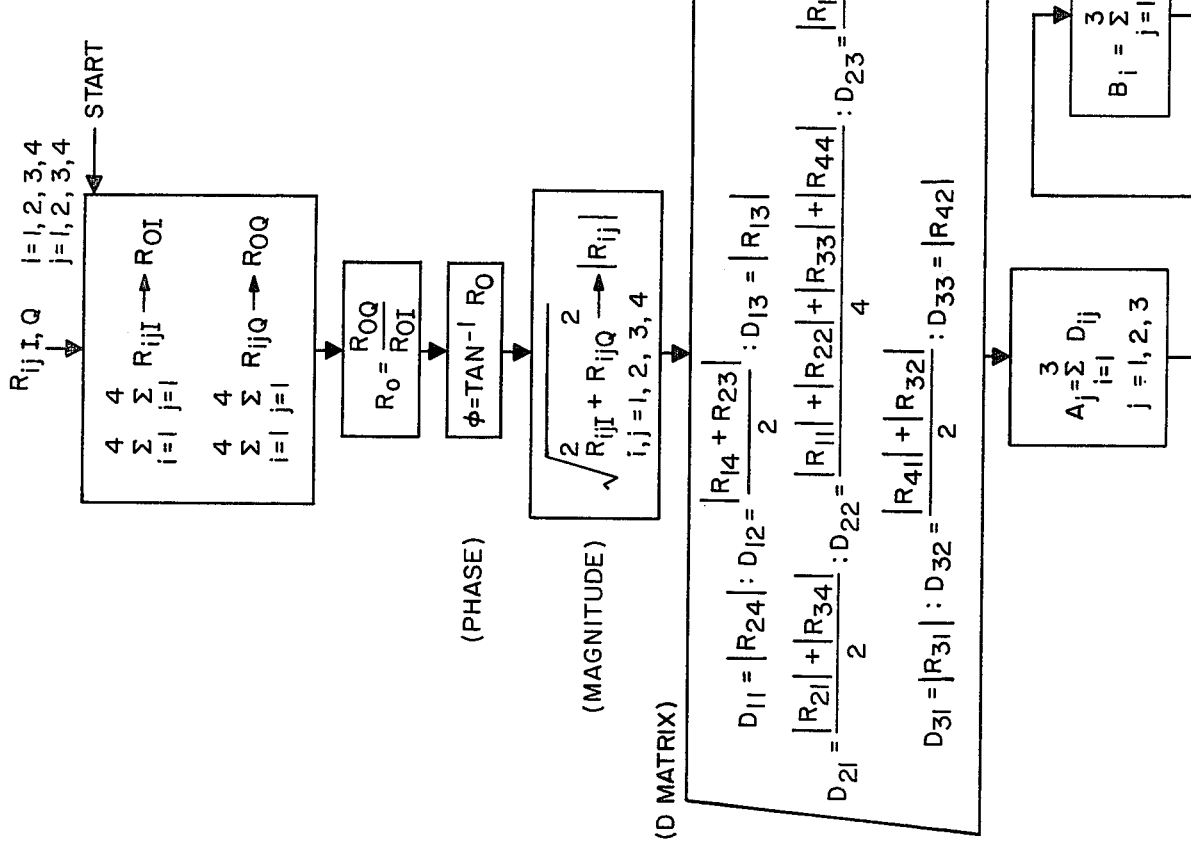

The operation of the microprocessor 49 in deriving the estimated correlation peak location in x, y and z is detailed in the flow chart of FIG. 12. The first step in the processing operation is the derivation of the estimate of peak correlation ($R_o$) which is used in the phase calculation in accordance with Equation 2 as previously explained. Next each of the complex numbers $R_{ij/Q}$ is converted to a real number, yielding 16 values as shown arranged in the D matrix. By averaging the absolute values of the indicated ones of the selected 16 correlation magnitude values, the number of values is reduced to nine with three in each of the x and y directions. Next the samples having the same locations in the x and y directions are summed, yielding two sets of three numbers $A_1$, $A_2$, $A_3$, $B_1$, $B_2$ and $B_3$ for use in curve fitting. The relations set forth in FIG. 12 assume a three-point fit in each dimension to a parabolic function.

Curve fitting is accomplished and the desired value of x is derived by interpolation using the relation:

$$x = \frac{1}{2} \frac{A_1 - A_3}{A_1 - 2A_2 + A_3} \quad \text{(Equation 4)}$$

The value of x thus derived represents the location of the peak in units of spacing between transducer elements. This measure is converted to velocity in accordance with the basic relation:

$$v_x = \frac{C_1 d}{2T_s} \cdot \frac{x}{N_t} \quad \text{(Equation 5)}$$

where $C_1$ is a constant, d is the transducer spacing, $N_t$ is the number of sampling intervals in the time delay interval, and $T_s$ is the sampling interval.

The same processing is performed to derive the velocity in y. Next the velocity in z is calculated using the relation shown, which is based on the previously computed phase angle $\phi$. Each of the velocity components $v_x$, $v_y$, $v_z$ also is smoothed by a filtering operation.

The final step in the velocity algorithm is the selection of a "new" integer value $N_T$ which may or may not be different from the previous or "old" value. The old value was used to control the transmitter timing during the previous transmission such that the repetition interval for waveforms or pulses was $N_T T_s$, and similarly was used to control the time delay during reception such that the time delay ($T_R$) also was $N_T T_s$. The new value is selected, as the older one was earlier, by computing the most suitable non-integer value and then rounding to an integer. An upper and lower limit also are programmed. Not included in FIG. 12 is the fact that the lower limit is selected when the system is first turned on. In the case of the four hydrophone square array the most suitable non-integer value is taken to be that which would place the correlation at $x = \frac{1}{2}$ which is half a hydrophone spacing in the forward direction under normal forward cruising conditions. In case the ship is going backwards the condition becomes $x = -\frac{1}{2}$ and in case the athwartship speed exceeds the fore or aft speed the condition becomes $y = \frac{1}{2}$ or $y = -\frac{1}{2}$.

With reference again to FIG. 9, the system operation is synchronized by a basic clock 111 which, through the clock generator and controls module 47, provides or controls the necessary clock frequencies and also the local oscillator signal for application to the demodulators 55. The outputs of the microprocessor 49 include as shown at 112 the calculated values of $v_x$, $v_y$, $v_z$, and $N_T$, and as shown at 113 various control signals for the operation of the correlator and transmitter. The microprocessor $N_T$ output at 113 is applied through a counter 115 in the transmit signal generator 45 to the PRN sequencer 117, to control the transmitter operating parameters including pulse length, time between the pulse pairs of each transmission cycle, and the time between cycles. The "TRANSMIT POWER" output gates the transducer drive amplifier 41 as indicated.

If the system is designed to provide bottom referenced velocity throughout most of the ocean areas of the world, transmitter carrier frequencies of 10 to 20 kilohertz and transmitted beamwidths of 10 to 40 degrees are suitable. Receive beamwidths can be chosen to be about twice as wide as the transmit beamwidth. Typically each receiving transducer could, for example, have a width (if square) or diameter (if round) of 4 to 6 inches with spacings being only slightly greater than the width or the diameter. If, on the other hand, the system is designed to track the bottom only in relatively shallow water with water mass tracking being used in deep water, a much higher frequency can be selected. Beam widths of the same order are suitable in either case which means that the transducers can be scaled down to much smaller dimensions in the case of a high frequency system.

The simple uncoded two-pulse waveform previously described may satisfactorily be used as the transmitter output waveform, and when operating in shallow water mode it is the preferred waveform, but at greater depths a coded or other more broadband waveform affords more accurate velocity determination by the correlation technique. This results from the fact that a coded waveform imposes reduced peak power requirements relative to an uncoded one of the same bandwidth, i.e., a short duration simple pulse. In processing the echo return, which in this case is the reflection from a volume of water or a bottom area, the fine range resolution of the wideband signal resolves the return into independent cells. The correlation process then sums over the range extent including these cells, which in effect smooths the measurement and reduces the measurement fluctuations.

Figure 13:
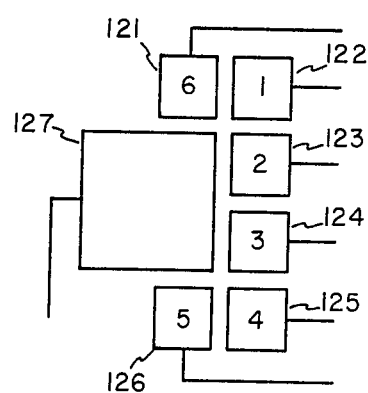
FIG. 13 illustrates an alternative array configuration.

With reference now to FIG. 13, there is shown an alternative transducer array configuration in which six receiving transducers 121-126 are disposed in a "C" configuration with the transmitting transducer 127 disposed partially within the C. This receiving transducer array configuration can be shown to be functionally interchangeable with the T configuration illustrated in FIG. 5, in the sense that vector element-pair spacings identical to each of the useful ones existing between the elements in the T configuration of the array can also be found between transducer elements in the C array configuration. Thus the alternate array configuration of FIG. 13 provides essentially the same set of vector separations as illustrated in FIG. 6.

The associated signal processing for this array may be similar to that illustrated in FIG. 9, modified as necessary to accommodate the larger number of hydrophone signal output values to be processed, and also to enable a number of additional capabilities as hereinafter described.

Referring again to FIG. 6 and to FIG. 8, it will be noted that there are twenty-one vector separations available with this array, and as previously noted it is necessary in order to derive the velocity vector in the vertical direction using amplitude information to make correlations and calculations for each of two or more different time delay values, as for example $T-T_s$, $T$, and $T+T_s$. To reduce the load on the associated microprocessor the vector separations in the horizontal plane are reduced to nine by discarding all except those of a $3\times 3$ matrix centered over the anticipated location of the correlation peak in vector separation space. This yields a three-dimensional grid or matrix with three correlation samples in each of the x, y and z directions, where z represents the time dimension. To estimate the location of the peak relative to the center of the matrix, the magnitudes of the complex quantities $R_{ij}(T_k)$ are summed in each of three different ways.

First, all the samples having the same locations in the x direction are summed, yielding three numbers which are fitted to a curve to give the location of the peak in the x direction. Then the same thing is done with respect to each of the other two directions. Weighting during the formation of each of the sums in proportion to the expected correlation in the other two dimensions is used. Equations for the location of the peak in each dimension may be of the type shown in FIG. 12 for the case of the four-element array. These are based on a three-point fit of the data in each dimension to a parabolic equation. As mentioned earlier a fit to a gaussian function having a fixed width parameter is preferred.

This is accomplished as follows. Assume, for example, the x dimension. Three equations to be solved simultaneously are:

$$A_I(x_o) = a\, e^{-k(I-2-x_o)^2} + b \qquad \text{(Equation 6)}$$

where I takes on the values 1, 2 and 3. Here R is the width parameter, a and b are constants, and $x_o$ is the peak location in normalized form, i.e. with the hydrophone spacing normalized to unity.

After algebraically removing the constants, a and b, the following form is obtained.

$$x_1 = \frac{e^{-2kx_o} - e^{+2kx_o}}{e^{-2kx_o} - 2e^{+k} + e^{2kx_o}} \qquad \text{(Equation 7)}$$

$$\text{where } x_1 \neq \frac{A_1 - A_3}{A_1 - 2A_2 + A_3} \qquad \text{(Equation 8)}$$

Now Equation 8 for $x_1$ is the same as that for the peak if a parabola instead of the gaussian had been used. Thus we can take, as a first step, the equation used previously and then convert the previous value corresponding to $x_1$ to the value $x_o$ corresponding to the gaussian function by solving Equation 7 of $x_o$ in terms of $x_1$. This can readily be done using either a table look-up procedure or a power series approximation. In either case, it turns out to be best to develop the solution in two parts, one with $x_1$ as variable, and the other with $1/x_1$ as the variable in order to avoid unduly large values of the variable.

As mentioned earlier, the curve fitting for the point of maximum correlation also can be done advantageously using an optimization technique to obtain the best approximate fit to a multidimensional set of measured values instead of by using equations based on exact fitting of data to three points in each dimension.

The optimization technique can be based, for example, on least squares minimization. In this case, a measure of the degree of fit can be written as follows, $$Q = \sum_{I,J,K} |A_{IJK} - R_{IJK}(\sigma_x, \sigma_y, \sigma_z)|^2 \qquad \text{(Equation 9)}$$

Here $\sigma_x$, $\sigma_y$ and $\sigma_z$ are the coordinates of the location of the peak in the space of vector separations, $A_{IJK}$ are the set of measured values of correlation and $R_{IJK}(\sigma_x, \sigma_y, \sigma_z)$ is the mathematical function to be fitted to the data, it being a function both of the coordinates of the data point as indicated by the subscripts and of the coordinates of the peak location as indicated by the parenthetical variables, and to be more specific is a three-dimensional function and conveniently a three-dimensonal gaussian function of the difference between the two sets of coordinates.

The coordinates $\sigma_x$, and $\sigma_y$ represent displacements in the plane of the array (the xy plane) while $\sigma_z$ represents an effective displacement in a direction which in most cases can be treated as normal to the xy plane and is related in terms of measured quantities to the time delay between pairs of signals by $$\sigma_z = c(T - T_m) \qquad \text{(Equation 10)}$$

where c is the velocity of sound, T is the time interval between transmissions and $T_m$ is the value of time delay which maximizes the correlation.

An algorithm for solving numerically for values $\hat{\sigma}_x$, $\hat{\sigma}_y$ and $\hat{\sigma}_z$ which minimizes Q can be programmed using one of several well known methods. The desired velocity components are $$v_x = \hat{\sigma}_x/2T \qquad \text{(Equation 11)}$$

$$v_y = \hat{\sigma}_y/2T \qquad \text{(Equation 12)}$$

$$v_z = \hat{\sigma}_y/2T \qquad \text{(Equation 13)}$$

When the A's and R's are complex and therefore include phase information as well as amplitude information, the minimization of Equation (9) can be accomplished but there will be several points of local minimum and steps must be taken to find the lowest of them or the global minimum. This can be done, but an alternative method which generally is simpler is to minimize using magnitude information and then use the phase information later. In this case the measure of the degree of fit can be $$Q = \sum_{I,J,K} (|(A_{KJK})| - |R_{IJK}(\sigma_x, \sigma_y, \sigma_z)|)^2 \qquad \text{(Equation 14)}$$

Now after solving for the values of $\sigma_x$, $\sigma_y$ and $\sigma_z$ that minimize this equation, a refinement of the $\sigma_z$ value can be made using phase information as follows. Estimate the complex correlation $R_o$ at the peak as $$R_o = \sum_{IJK}((R^*_{IJK}\,\hat{\sigma}_x, \hat{\sigma}_y, \hat{\sigma}_z))A_{IJK} \qquad \text{(Equation 15)}$$

The estimated correlation phase then is $$\phi = \arctan(\text{Imag}(R_o)/\text{Real}(R_o)) \qquad \text{(Equation 16)}$$

The value of $\sigma_z$ then is incremented by $$\Delta\hat{\sigma}_z = C/f_o\,(\phi/2\pi) \qquad \text{(Equation 17)}$$

where $f_o$ is the carrier frequency. Obviously, these equations reduce to simpler forms where the vertical or z component of velocity is not needed or where this component can be derived satisfactorily from phase information without use of amplitude information.

Figure 14:
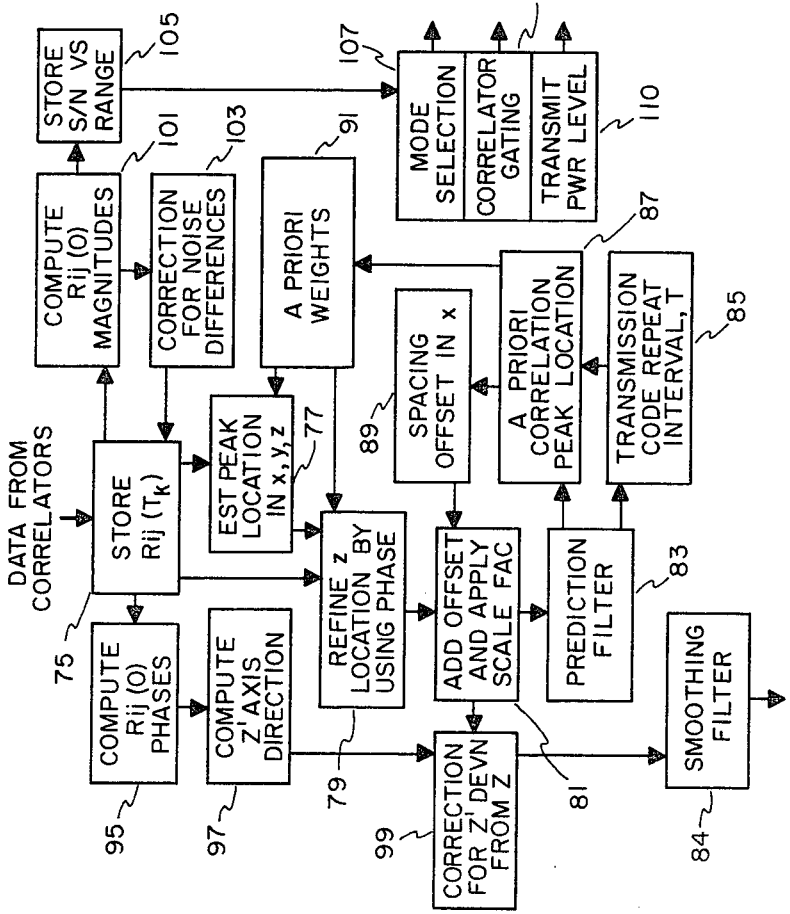
FIG. 14 illustrates a velocity algorithm suitable for use with the array configuration of FIG. 13.

The method for programming the microcomputer to accomplish these and the other necessary computations is indicated in the diagram of FIG. 14, showing the velocity algorithm including certain of its control functions. As shown, the measured values of the correlation $A_{IJK}$ or $A_{IJ}(T_k)$ are stored at 75, and from them there is derived at 77 an estimate of the peak location in each of the x, y and z dimensions in the manner previously described, including vernier adjustment of the z estimate at 81 using phase as also described. The estimated peak locations have the appropriate offsets added at 81, representing the position of the selected set of correlation sample points from the center of the vector separation space, and an appropriate scale factor also is applied.

the fluctuation errors in a velocity measurement based on a single transmission may be excessive. Therefore, some averaging or filtering usually is desired to further reduce such errors, and this filtering is performed by a prediction filter 83 and smoothing filter 84. These filters are preferably but not necessarily separate from each other; the same filter could be used but their purposes are somewhat different and, for the prediction filter, a simple two-pole recursive filter is suitable.

The output of this prediction filter performs additional functions for the purpose of optimizing the velocity estimation process for the next transmission cycle as will be explained. Referring again to FIG. 6, the best percentage accuracy is obtained if the scaled velocity vector falls near but not too close to the edges of the region enclosed by the available sample points. The scaling factor T which controls velocity vector location on the grid (in the x, y plane) is the repetition interval of the transmitter, and is preselected, at 85, as an integer times a sampling interval during one transmission cycle for use during the next, in a manner similar to that previously described in connection with FIG. 12. Using the predicted velocity, an optimum value of T is computed and then rounded to an integral multiple of the sampling clock interval $T_s$. Under normal conditions the forward velocity is the controlling component and T is chosen to place the predicted peak at a forward spacing of about 2.5. If the athwartship component is large enough, however, it will be controlling and T will be chosen to keep the predicted peak within the range of about ±0.75 in terms of athwartship spacing.

After T is selected, the correlation sample points are selected for use in the next computation. As has been noted the same vector spacings often can be provided using different transducer pairs. In these cases one of the possible pairs may be a normal choice, with an alternate choice being made in the event a channel becomes non-operative.

Selection of correlation sample points is made at 87, using as input information the selected value of the interval T for the next transmission cycle and the prediction filter output indication of correlation peak location. Thus the a priori correlation peak locator chooses the set of sample points that are to be placed around the correlation peak in its predicted next location, and instructs the correlator as to which pairs of transducers to select for use in processing returns from the next transmission cycle. It also controls the a priori weightings to be given at 91 to the measured correlation values, introduces at 89 the grid spacing offset required, and determines the time delays $T_N$, $T_{N-1}$ and $T_{N+1}$ in terms of clock intervals which should be used in processing the signal returns from the next transmission.

Correction may be made for any deviation of the z direction, which is the effective beam direction, from the vertical. To accomplish this, the correlator obtains cross correlations between pairs of adjacent transducers with zero time delay. Five adjacent pairs are available, two pairs being separated in the y direction and three pairs being separated in the x direction. The phase angles derived from these complex correlation values provide information on the average angle of arrival. The following equations then are used to correct the velocity:

$$\cos\theta_x = \lambda\phi_x/(2\pi d) \qquad \text{Equation 18}$$

$$\cos\theta_y = \lambda\phi_y/(2\pi d) \qquad \text{Equation 19}$$

$$v_x = v'_x + v'_x\cos\theta_x \qquad \text{Equation 20}$$

$$v_y = v'_y + v'_z\cos\theta_y \qquad \text{Equation 21}$$

$$v_z = v'_z[1 - \cos^2\theta_x - \cos^2\theta_y]^{\frac{1}{2}} \qquad \text{Equation 22}$$

Here $\phi_x$ is the phase difference between receivers separated in the x direction (average of 3 values), $\phi_y$ is the phase difference between receivers separated in the y direction (average of 2 values); $\lambda$ is the wavelength, d is the transducer separation, $v'_x$, $v'_y$ and $v'_z$ are velocity components obtained with neglect of skew angle and $v_x$, $v_y$, and $v_z$ are the corrected velocity components. Angles $\phi_x$ and $\phi_y$ define the direction of z' relative to the x-axis and the y-axis respectively, and are not explicitly computed since only their cosines are called for.

It may be noted that deviations of the z' axis from the vertical result from two causes, one being any shift in beam pointing angle which occurs between transmission and reception, and the other being variations in bottom scattering strength as a function of angle of incidence combined with non-vertical incidence of the transmitted beam onto the bottom. The first deviation is a function of range and of rates of ship roll and pitch; the second is a function of the type of bottom and the bottom slope, as well as of the ship roll, pitch, list and trim. These deviations usually are small and especially their eventual effects are small in cases where long term averages of data through several roll and pitch cycles are made. However, correction may if desired be factored into the velocity measures at 99 before output through the smoothing filter 84.

Correction may also be made for noise differences between channels. In making correlation measurements, clipped signals (sign bit only) are used. This method not only is simple but it has the virtue of normalizing the measurements relative to transducer sensitivities and amplifier gains. However, differences in noise level among the channels can produce some bias error. A correction for this is made based on zero-delay cross-correlation measurements between adjacent channels. These are the same measurements used in correcting for vertical axis deviation, but in this case the magnitudes rather than the phase angles of the complex correlation values are used. From these magnitudes, computed at 101, an effective signal gain for each channel relative to one artibrarily selected channel is determined and used as a scale factor or correction at 103.

In order to provide automatic rather than manual control of various functions which may change with time, the velocity algorithm of FIG. 14 also includes provision at 105 for measuring signal-to-noise (S/N) ratio and storing such measure as a function of range. This stored information is used in mode selection at 107, correlator gating at 109 and transmitter power level control at 110, as hereinafter explained.

As previously indicated, the correlation velocity sensor of the present invention may track either off the bottom or a volume of water at some point between the ship and the bottom. The mode control decisions for selecting between these alternative modes are made primarily on the basis of measurements of signal-to-noise ratio as a function of range or time, the S/N ratios being determined at time intervals corresponding to successive range increments of perhaps 16 feet by measuring the cross correlation between adjacent receiving transducers with zero time delay.

After all the measurements for each transmission cycle are completed, the range cells are scanned to identify regions of water return and of ground return. The transmit power also is available at this time. Water return is required to occupy contiguous range cells starting with the first and continuing to a value which is commensurate with the power level used. Ground return is required to occupy two or more contiguous range cells and can start with the first only if the power level is low enough to preclude water return. Several regions of possible ground return may be identified, in which case the most distant one is assumed to be the correct one. After the water and ground return regions have been identified, the decision regarding mode for the next transmission cycle is made.

Manual, rather than automatic control of the functions of mode selection, gating and power level control, would of course be a simplification and may be preferred.

The choice of transducer array geometry, and specifically of the spacing between transducers in the receiver array, is a compromise that takes into account the width of the correlation function, the aperture necessary to limit the statistical fluctuations of the measurements. In general the longer the base line, i.e. the greater the spacing between transducers, the smaller are such fluctuations.

As is evident already, a given set of inter-element or vector spacings can be obtained from more than one transducer configuration. For example, the rectangular set of 7 by 3 vector spacings that is available from the 6-element "T" configuration of FIG. 5 also is available not only from the 6-element "C" configuration of FIG. 13 but also from the 8-element rectangular configuration of FIG. 15 and from the 6-element configuration of FIG. 16.

Figure 15:
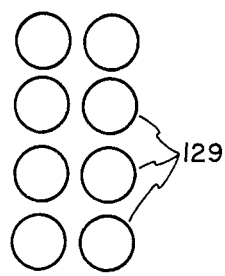
FIGS. 15-17 illustrate alternative array configurations.

In addition to the availability of certain spacings, other factors may make one configuration more desirable than another for specific applications. For example, the "C" configuration may require less space than the "T". The array of FIG. 15 provides a great deal of redundancy, that is, almost all the desired spacings can be obtained from more than one pair of the elements 129. This feature can be used to provide for continued operation of the system in the event that certain transducers or associated amplifiers develop failures and are unusable. Another factor to be considered, especially in the case of a low frequency system where the physical size of the transducers tends to make them rather costly, is the fact that four transducers placed close together in a square are suitable not only for use as separate receivers but also can be driven in parallel to form a suitable transmitting unit. The configuration of FIGS. 16 and 17 as well as the 4-element configuration of FIG. 9 all can be used in this manner.

Figure 16:
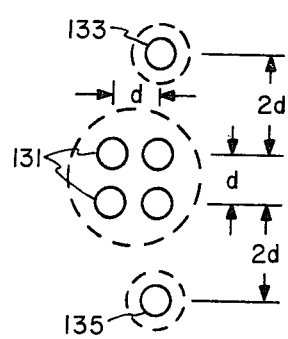
Figure 17:
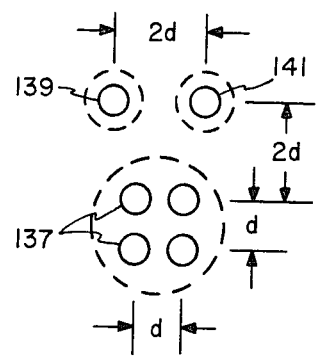

In some cases it may be desirable to mount the transducers through the ship's hull in such a way that they can be removed and replaced at sea through gate valves. The configuration of FIG. 16 provides enough clearance between each of the two separated transducers 133 and 135 and the closely spaced transducers 131 that separate gate valves can be provided for the two spaced transducers and for the group of four. The group of four transducers 137 and the transducers 139 and 141 of FIG. 17 also can be mounted in this manner. In the case of FIG. 17 the set of vector spacings is slightly different from that available in the other 6-element arrays but is quite suitable provided the curve fitting algorithm is modified to fit it.

The invention has been described as applied to a velocity measuring system for use with marine vessels, both surface vessels and submarines. In certain of its aspects, however, it will be appreciated that the invention is applicable also to other systems for measuring the relative velocity of one body with respect to another, as for example aircraft velocity measurement, and the measuring of the speed of movement of liquid streams or of strips of material in roll mill control applications and the like. These and other adaptations and modifications of the invention will be obvious to those skilled in the art, and it is accordingly the intent of the appended claims to cover all such thereof as fall within the true spirit and scope of the invention.

What is claimed and desired to be secured by Letters Patent of the United States is:

1. Apparatus for measuring the relative velocity of a wave energy source-sensor combination with respect to a field of scatterers separated therefrom by a medium through which the wave energy is propagated, comprising:

(a) a plurality of wave energy transducers included in said source-sensor combination, said transducers having directivity in the general direction of the scattering field and comprising an array of at least two receiving transducers separated from each other by known distances in a plane perpendicular to the major axis of directivity;

(b) means for energizing at least one of said transducers to emit a wave energy pulse train comprising first and second pulses having a predetermined pulse repetition period;

(c) means for sampling simultaneously the echo returns from said scatterer field to the receiving transducers of said array at predetermined sampling intervals;

(d) means for computing a set of measured values of complex correlation using time-delayed samples of echo returns from said first pulse and undelayed samples of echo returns from said second pulse, as sensed at a selected plurality of said receiving transducers, the period of delay of said time-delayed samples being equal to an integral number of sampling intervals and equal to said predetermined pulse repetition period;

(e) means for processing each of said measured values of complex correlation as a sample of a continuous function of position with each such sample being associated with a location equal to the vector spacing between the pair of receiving transducers from which the samples were obtained, and curve fitting such samples to said continuous function to provide an estimate of the location in vector space of the peak value of correlation magnitude; and (f) means for deriving an output measure of velocity in each of two directions of relative motion by dividing the components of the location of the correlation magnitude peak along each of said directions by twice said predetermined interpulse interval.

2. The method of deriving a measure of the relative velocity of a wave energy source-sensor combination and a field of scatterers separated therefrom by a medium through which the wave energy is propagated, where the source-sensor combination includes as part thereof wave energy emission means and a plurality of wave energy receiving transducers located in a plane normal to the general direction of wave energy emission and with predetermined separation between transducers in the direction or directions along which relative velocity is to be measured, comprising the steps of:

(a) energizing said wave energy emission means to emit in the general direction of said field of scatterers a wave energy pulse train comprising a plurality of pulses having a predetermined pulse repetition period;

(b) sensing the echo returns from said scatterer field to each of said wave energy receiving transducers;

(c) complex sampling the echo return signal from each of said receiving transducers at sampling intervals equal to a submultiple of said pulse repetition period to provide a first set of complex samples;

(d) processing said first set of complex samples through delay means providing a time delay equal to an integer multiple of said pulse repetition period to provide a second set of complex samples delayed with respect to said first set;

(e) presenting to a complex correlator during each of said sampling intervals said first and second sets of samples from each of two or more transducers with the delayed set consisting primarily of echoes from the first pulse and the undelayed set consisting primarily of echoes from the second pulse, and forming as outputs the complex products of members of said first set with complex conjugates of members of said second set, to produce a set of correlation values the magnitude of each of which is associated with a particular pair of transducers and with a particular time delay;

(f) processing at least some of said correlation values as samples of a continuous function of position, the position associated with a given value being determined by the location of the first member of the particular transducer pair from which the complex product was derived relative to the location of the second member of the pair;

(g) curve fitting said samples to the magnitude or real part of said continuous function to provide an estimate of the location in vector space of the peak value; and (h) dividing the components of the location of the correlation peak along each of said directions by twice said predetermined pulse repetition period, to yield an output measure of velocity in each of those directions.

3. A method for velocity measurement as defined in claim 2 further comprising the step of deriving a measure of relative velocity along the direction substantially parallel to that of wave energy propagation between the source-sensor combination and the scatterer field, by obtaining a measure of phase of the complex correlation at the correlation peak, and converting such phase measure to a time difference from which the desired measure of relative velocity can be derived.

4. A method for velocity measurement as defined in claim 3 wherein said measure of phase at the correlation peak is derived as a weighted sum of complex correlation values near said peak.

5. A method for velocity measurement as defined in claim 2 further comprising the step of deriving a measure of relative velocity along the direction substantially parallel to that of wave energy propagation between the source-sensor combination and the scatterer field, by curve fitting using the real part of said complex correlation values to yield a direct estimate of this velocity.

6. A method for velocity measurement as defined in claim 2 further comprising the step of deriving a measure of relative velocity along the direction substantially parallel to that of wave energy propagation between the source-sensor combination and the scatterer field, by generating sets of correlation values for two or more values of time delay differing from the pulse repetition period by increments equal to small integer multiples of said sampling interval, processing the correlation values as samples of a continuous function of position with position determined by the relative locations of said transducer pair and with the location of one of the pair effectively displaced in the direction of wave energy propagation by an amount equal to the product of the wave velocity times said time delay increment, curve fitting said samples to said continuous function to determine the correlation peak location in said direction, and deriving therefrom an output measure of velocity in that direction.

7. A method for velocity measurement as defined in claim 2 further comprising the step of deriving a measure of relative velocity along the direction substantially parallel to that of wave energy propagation between the source-sensor combination and the scatterer field, by deriving a coarse measure of correlation peak location as a function of time by use of amplitude values and applying a phase-derived measure of correlation peak location as a vernier on said coarse measure.

8. A velocity measuring correlation sonar system comprising:

(a) a plurality of receiving transducer elements disposed in a planar array with at least two thereof spaced in the directions along which velocity components parallel to the plane of the array are to be measured;

(b) pulse transmission means including means for emitting a pulse train comprising at least two identical pulses having a predetermined pulse repetition period;

(c) means for complex sampling simultaneously the echo returns to said receiving transducers at predetermined sampling intervals equal to a submultiple of said pulse repetition period, to produce a first set of complex samples;

(d) time delay means and means for applying said first sample set thereto to produce a second set of samples delayed with respect to the corresponding samples of said first set by a time interval equal to said pulse repetition period;

(e) means for computing a set of measured values of complex correlation using said set of time-delayed samples from an earlier one of said pulses and said set of undelayed samples from a later one of said pulses;

(f) means for processing each of said complex correlation values with each value corresponding to a location representing the vector spacing between the transducer pair from which the samples were obtained, and for curve fitting such samples to the correlation function to thus determine the location in vector space of the peak value of correlation magnitude;

(g) means for adjusting said pulse repetition period for the next following pulse train in approximate accordance with the correlation peak location; and (h) means for deriving an output measure of velocity in said directions of relative motion by dividing the components of the location of the correlation magnitude peak along each of said directions by twice said pulse repetition period.

9. A velocity measring correlation sonar system as defined in claim 8 further including means for deriving from said set of complex correlation values a measure of the velocity component normal to the plane of the array by locating the correlation peak as a function of time or phase, or both.

10. A velocity measuring correlation sonar system as defined in claim 8 wherein said receiving transducer array comprises at least four transducer elements disposed in a square configuration with each providing both transmit and receive functions.

* * * * *